United States Patent
Reimer et al.

(10) Patent No.: US 9,038,931 B2
(45) Date of Patent: May 26, 2015

(54) PROCESS FOR PREPARING ALUMINIUM TRIHYDROXIDE

(75) Inventors: Alfred Reimer, Furth im Wald (DE); Carsten Ihmels, Schwandorf (DE); Christian Beer, Beratzhausen (DE)

(73) Assignee: NABALTEC AG, Schwandorf (DE)

( * ) Notice: Subject to any disclaimer, the term of this patent is extended or adjusted under 35 U.S.C. 154(b) by 66 days.

(21) Appl. No.: 13/817,454

(22) PCT Filed: Aug. 12, 2011

(86) PCT No.: PCT/EP2011/063957
§ 371 (c)(1),
(2), (4) Date: Jun. 6, 2013

(87) PCT Pub. No.: WO2012/022692
PCT Pub. Date: Feb. 23, 2012

(65) Prior Publication Data
US 2013/0296466 A1    Nov. 7, 2013

(30) Foreign Application Priority Data
Aug. 18, 2010   (EP) ...................................... 10173296

(51) Int. Cl.
*B02C 11/08*   (2006.01)
*B02C 21/00*   (2006.01)
*C08K 7/00*   (2006.01)
(Continued)

(52) U.S. Cl.
CPC . *C08K 7/00* (2013.01); *C01F 7/023* (2013.01); *C09C 1/407* (2013.01); *C09K 21/02* (2013.01); *C01P 2004/52* (2013.01); *C01P 2004/61* (2013.01); *C01P 2006/12* (2013.01); *C01P 2006/82* (2013.01)

(58) Field of Classification Search
USPC ................................................ 241/17, 18, 23
See application file for complete search history.

(56) References Cited

U.S. PATENT DOCUMENTS

2003/0207980 A1   11/2003   Onishi et al.
2004/0147659 A1   7/2004   Sauerwein et al.
(Continued)

FOREIGN PATENT DOCUMENTS

DE   10248174   11/2003
EP   1 555 286   7/2005
(Continued)

OTHER PUBLICATIONS

Micral 632 Alumina trihydrate technical data sheet.*
(Continued)

*Primary Examiner* — Faye Francis
(74) *Attorney, Agent, or Firm* — Klauber & Jackson LLC

(57) ABSTRACT

The invention relates to a process for the milling-drying of a raw mixture containing aluminum trihydroxide having an average particle size $D_{50}$ in the range from 50 to 130 μm and a specific BET surface area in the range from 0.01 to 0.5 m²/g and containing from 0.1 to 20% by weight of water, based on the raw mixture, which including the steps
i) introduction of the raw mixture into a milling-drying apparatus,
ii) introduction of a hot air stream having a temperature in the range from 20 to 100° C. into the milling-drying apparatus so as to flow through the milling-drying apparatus and
iii) comminution of the aluminum trihydroxide present in the raw mixture in the milling-drying apparatus.

7 Claims, 3 Drawing Sheets

(51) Int. Cl.
*C01F 7/02* (2006.01)
*C09C 1/40* (2006.01)
*C09K 21/02* (2006.01)

(56) References Cited

U.S. PATENT DOCUMENTS

| | | |
|---|---|---|
| 2006/0084744 A1 | 4/2006 | Kuhn et al. |
| 2006/0140851 A1 | 6/2006 | Onishi |
| 2007/0217993 A1 | 9/2007 | Reimer et al. |
| 2008/0072785 A1* | 3/2008 | Suau et al. .................. 106/31.9 |
| 2009/0176921 A1 | 7/2009 | Herbiet et al. |
| 2009/0281225 A1 | 11/2009 | Eto et al. |
| 2013/0296466 A1 | 11/2013 | Reimer et al. |

FOREIGN PATENT DOCUMENTS

| | | |
|---|---|---|
| EP | 1 840 085 | 10/2007 |
| WO | 2008053355 | 5/2008 |

OTHER PUBLICATIONS

J.M. Huber Corporation, Huber Fire Retardant Additives, Micral 632 Alumina Tryhydrate, www.hubermaterials.com, 2011 J.M. Huber Corporation, 1 page.

* cited by examiner

PROCESS FOR PREPARING ALUMINIUM TRIHYDROXIDE

CROSS REFERENCE TO RELATED APPLICATIONS

The present application is a National Stage Application claiming the priority of co-pending PCT Application No. PTC/EP2011/063957 filed Aug. 12, 2011, which in turn, claims priority from European Patent Application No. 10173296.4 filed Aug. 18, 2010. Applicants claim the benefits of 35 U.S.C. §120 as to the PCT application and priority under 35 U.S.C. §119 as to the said European Patent application, and the entire disclosures of both applications are incorporated herein by reference in their entireties.

The invention relates to a process for milling-drying of a raw mixture containing aluminum trihydroxide, the aluminum trihydroxide which can be obtained from this process, the use of the aluminum trihydroxide obtained as flame retardant and a process for producing flame-resistant thermosets.

Polymers are used as materials in the building, furniture, transport, electrical and electronics industries. For many applications, the polymers have to meet national and international flame retardant standards. Since most polymers, in particular those which can be obtained from monomers having a hydrocarbon basis, are flammable, it is necessary to equip the polymers with flame retardants in order to be able to achieve classification of the polymer as flame-resistant. In general, this is achieved by the addition of organic or inorganic flame retardants. Flame retardants used are, for example, metal hydrates, with the metal hydrates of aluminum having attained particular importance (G. Kirschbaum, Kunststoffe; 79, 1999, 1205-1208 and R. Schmidt, Kunststoffe, 88, 1998, 2058-2061).

The flame-retardant action of aluminum trihydroxide is based on the thermal elimination of the chemically bound water in the case of fire at temperatures in the range from 200 to 400° C. This endothermic decomposition of the aluminum trihydroxide consumes energy, as a result of which the surface of the plastic is cooled. In addition, the liberated water vapor dilutes the combustible organic degradation products of the polymers. The aluminum oxide which remains as residue has a high specific surface area and absorbs polycyclic and aromatic hydrocarbon compounds formed in the combustion of the polymer. As a result, these compounds are withdrawn from the combustion process. Since polycyclic and aromatic hydrocarbon compounds are constituents of black smoke from a fire, aluminum trihydroxide also contributes to reducing the smoke density in the case of fire. The use of aluminum trihydroxide thus makes it possible to produce halogen-free flame-resistant polymers, with the use of halogen-containing fire retardants being able to be dispensed with.

However, it is necessary to use large amounts of aluminum trihydroxides in plastics in order to ensure sufficient flame-resistance and meet the flame protection standards. Owing to this high degree of fill, the processing process for such flame-resistant polymer mixtures is often difficult, especially when the aluminum trihydroxide is used in liquid resins, and the mechanical properties of the plastics obtainable therefrom are often unsatisfactory.

In principle, high surface areas are desirable for reasons of flame retardance effectiveness, but these make incorporation into the polymer and its subsequent further processing significantly more difficult because of a greater viscosity increase. Although low BET surface areas are advantageous because of the easier incorporation into polymers, they are at the same time disadvantageous since aluminum trihydroxide having a low BET surface area has only an unsatisfactory flame retardance effect. For this reason, a distinction is generally made, depending on the use and incorporation technology, between relatively coarse, milled grades and very fine precipitated aluminum trihydroxide grades.

When aluminum trihydroxide is used in liquid resins, quite coarse aluminum trihydroxide which is obtained from crude aluminum hydroxide by milling is usually employed.

This achieves not only a reduction in the average particle size $D_{50}$ but also a significant increase in the specific BET surface area. The aluminum trihydroxides obtained by milling processes according to the prior art therefore have an improved flame retardant effect. However, such aluminum trihydroxides can be used only to a limited extent as flame retardants since when incorporated into liquid resins they lead to a drastic increase in viscosity of the liquid resin mixture, which makes the processing of such liquid resin mixtures difficult or impossible. The milling process is therefore usually stopped at average particle sizes above 5 µm because acceptable surface areas in the range ≤3 m²/g are still obtained here. A greater degree of milling produces a significant increase in the surface area and makes the processing of the resulting aluminum trihydroxide and the compounds produced therefrom more difficult to an unacceptable degree. The precipitation route in which lower surface areas can in principle be achieved is therefore selected for the preparation of finely divided aluminum trihydroxide.

In the case of thermoplastic and rubber applications, very fine precipitated aluminum trihydroxide grades are generally used.

For this purpose, coarse crude aluminum trihydroxide is dissolved in sodium hydroxide solution and subsequently precipitated in a controlled manner. This process gives aluminium trihydroxide which generally has an average particle size $D_{50}$ significantly below 3 µm. The aluminum trihydroxides obtained in this way have a relatively low specific BET surface area, usually in the range from 2 to 12 m²/g, rarely higher. When aluminum trihydroxides having such particle sizes are prepared by complicated milling processes, this leads to aluminum trihydroxides having significantly higher BET surface areas.

Aluminum trihydroxide having a high specific BET surface area is thus, on the one hand, advantageous since the flame retardant effect increases with increasing specific BET surface area, but on the other hand such aluminum trihydroxides lead, when incorporated into liquid resins, to a drastic increase in viscosity, which makes the processing of the resins difficult or even impossible. EP 1 555 286 describes a process in which aluminum trihydroxide which has been obtained by precipitation and filtration and has an average particle size $D_{50}$ in the range from 0.8 to 1.5 µm and a high water content in the region of 50% by weight, based on aluminum trihydroxide, is subjected to a milling-drying process at temperatures in the range from 150 to 450° C. The aluminum trihydroxide which can be obtained by this process has good viscosity properties in liquid resins, but there is still room for improvements. A disadvantage of the process described in EP 155 286 is, in particular, that an aluminum trihydroxide which can be obtained by precipitation and has an average particle size $D_{50}$ in the range from 0.8 to 1.5 µm has to be used.

A further possible way of avoiding the disadvantageous viscosity properties of aluminum trihydroxide in liquid resin systems has been described in the prior art and comprises coating aluminum trihydroxide particles with organic additives such as silanes, fatty acids and/or titanates.

It is therefore an object of the invention to provide a process for preparing aluminum trihydroxide which has a high specific BET surface area and can readily be incorporated into liquid resins and, in particular, does not lead to the above-described drastic increases in viscosity. The process should be less expensive than the processes described in the prior art and, in particular, costly coating processes should be avoided and aluminium trihydroxides having significantly higher average particles sizes $D_{50}$ should also be able to be used as starting materials.

The object is achieved by a process in which a raw mixture containing aluminum trihydroxide having an average particle size in the range from 50 to 130 μm is subjected to a milling-drying process. The invention therefore provides a process for the milling-drying of a raw mixture containing aluminum trihydroxide having an average particle size $D_{50}$ in the range from 50 to 130 μm and a specific BET surface area in the range from 0.01 to 0.5 m$^2$/g and containing from 0.1 to 20% by weight of water, based on the raw mixture, which comprises the steps i) introduction of the raw mixture into a milling-drying apparatus,
ii) introduction of a hot air stream having a temperature in the range from 20 to 100° C. into the milling-drying apparatus so as to flow through the milling-drying apparatus and
iii) comminution of the aluminum trihydroxide present in the raw mixture in the milling-drying apparatus.

The process of the invention is cheaper than the processes known in the prior art. Aluminum trihydroxides having an average particle size $D_{50}$ in the range from 50 to 130 μm can be used in the process of the invention. In addition, the process of the invention can, compared to processes according to the prior art (EP 155 286; from 150 to 450° C.), be carried out at significantly lower temperatures, which leads to an energy saving and also rules out dehydration of aluminum trihydroxide to aluminum oxide.

The aluminum trihydroxide which can be obtained by the process of the invention has a high specific BET surface area and therefore an excellent flame retardant effect. The aluminum trihydroxide which can be obtained by the process of the invention can readily be incorporated into liquid resins and, in particular, does not lead to a drastic increase in the viscosity of the liquid resin mixture obtained, as is observed in the case of aluminum trihydroxides from the prior art.

The raw mixture used in the process of the invention contains from 50 to 99.9% by weight, preferably from 80 to 99.85% by weight, of aluminum trihydroxide, from 0.1 to 20% by weight of water and optionally from 0 to 30% by weight of further substances such as boehmite, magnesium hydroxide, stannates, silanes, polycondensed silanes, siloxanes, borates, fatty acids, fatty acid esters, salts of fatty acids, polymer emulsions, polymer solutions and/or titanates.

The raw mixture preferably contains aluminum trihydroxide having an average particle size $D_{50}$ in the range from 50 to 130 μm, preferably in the range from 80 to 120 μm, more preferably in the range from 90 to 110 μm and particularly preferably in the range from 95 to 105 μm. The average particle sizes $D_{50}$ indicated in the present invention have been determined by means of laser light scattering (laser light scattering instrument Cilas 1064, evaluation by the Fraunhofer method).

The aluminum trihydroxide present in the raw mixture preferably has a specific BET surface area in the range from 0.01 to 0.5 m$^2$/g, preferably from 0.05 to 0.4 m$^2$/g, more preferably from 0.06 to 0.35 m$^2$/g and particularly preferably from 0.07 to 0.25 m$^2$/g. The specific BET surface areas indicated in the present invention have been determined by the Brunauer-Emmet-Teller method in accordance with ISO 9277.

The raw mixture generally contains from 0.1 to 20% by weight of water, based on the raw mixture. The raw mixture preferably contains from 3 to 15% by weight, more preferably from 4 to 12% by weight and particularly preferably from 6 to 10% by weight, of water, based on the raw mixture.

In a preferred embodiment, the raw mixture contains an aluminum trihydroxide which as a result of the method of preparation contains from 1 to 20% by weight, preferably from 3 to 15% by weight, more preferably from 4 to 12% by weight and in particular from 6 to 10% by weight, of water, based on aluminum trihydroxide. In this case, the water present in the raw mixture originates solely from the aluminum trihydroxide present in the raw mixture. It is also possible to use aluminum trihydroxides having a lower water content and add water to the raw mixture. However, this is not preferred.

The raw mixture can comprise further substances such as boehmite, magnesium hydroxide, stannates, silanes, polycondensed silanes, siloxanes, borates, fatty acids, fatty acid esters, salts of fatty acids, polymer emulsions, polymer solutions and/or titanates in addition to aluminum trihydroxide. These substances are preferably present as a result of the method of preparation in the aluminum trihydroxide present in the raw material. It is also possible to add further substances to the raw mixture.

In one embodiment, a raw mixture comprising aluminum trihydroxide containing from 0.1 to 20% by weight of water, preferably from 3 to 15% by weight of water, more preferably from 4 to 12% by weight and particularly preferably from 6 to 10% by weight of water, based on the aluminum trihydroxide and having an average particle size $D_{50}$ in the range from 50 to 130 μm, preferably from 80 to 120 μm, more preferably from 90 to 110 μm and particularly preferably from 95 to 105 μ, and a specific BET surface area in the range from 0.01 to 0.5 m$^2$/g, preferably from 0.05 to 0.4 m$^2$/g, more preferably from 0.06 to 0.35 m$^2$/g and particularly preferably from 0.07 to 0.25 m$^2$/g, is used.

In a preferred embodiment, a raw mixture comprising aluminum trihydroxide containing from 6 to 10% by weight of water, based on aluminum trihydroxide, and having an average particle size $D_{50}$ in the range from 90 to 110 μm and a specific BET surface area in the range from 0.07 to 0.25 m$^2$/g is used.

According to the process of the invention, the raw mixture is introduced into a milling-drying apparatus in step i). Suitable milling-drying apparatuses are known per se and are described, for example, in Lueger, Lexikon der Technik, volume 48, page 394.

In a particular embodiment, the milling-drying apparatus contains a rotor which is mounted in a fixed manner on a solid shaft and rotates at a circumferential velocity in the range from 20 to 200 m/s, preferably from 30 to 180 m/s, more preferably from 90 to 120 m/s and particularly preferably from 60 to 70 m/s.

The invention therefore also provides a process in which the milling-drying apparatus contains a rotor-stator system and the rotor has a circumferential velocity in the range from 20 to 200 m/s.

The introduction of the raw mixture into the milling-drying apparatus (step i)) can be effected by methods known per se, for example conveyor belts, screw conveyors, eccentric screw pumps and spiral conveyors. In a preferred embodiment, the raw mixture is introduced into the milling-drying apparatus by means of a screw conveyor.

In step ii), a hot air stream having a temperature in the range from 20 to 150° C., preferably from 20 to 120° C., more preferably from 20 to 100° C. and particularly preferably from 20 to 80° C., is introduced into the milling-drying apparatus. In a preferred embodiment, the hot air stream enters at the lower end of the milling-drying apparatus through an inlet opening into the milling-drying apparatus and flows through the latter from the bottom upward, with the hot air stream forming a turbulent flow in combination with the rotary motion of the rotor of the milling-drying apparatus, and leaves the milling-drying apparatus through an outlet opening at the upper end of the milling-drying apparatus. In a preferred embodiment, the hot air stream in the milling-drying apparatus has a Reynolds number of >3000. The hot air stream generally flows through the milling-drying apparatus at an air throughput in the range from 3000 to 7000 m$^3$/h at operating pressure.

In the milling-drying apparatus, the aluminum trihydroxide present in the raw mixture is accelerated by the hot air stream in combination with the rotary motion of the rotor. This results in comminution of the aluminum trihydroxide present in the raw mixture by impacts of the aluminum trihydroxide particles with one another and/or by impacts of the aluminium trihydroxide particles on the rotor-stator system of the milling-drying apparatus (step iii)). At the same time, water is withdrawn from the raw mixture by means of the milling energy liberated. The aluminum trihydroxide present in the raw mixture is subsequently discharged from the milling-drying apparatus. In a preferred embodiment, discharge occurs through the exit opening through which the hot air stream introduced into the milling-drying apparatus leaves. The mixture containing aluminum trihydroxide, hot air stream and the water withdrawn from the aluminum trihydroxide of the raw mixture leaving the reactor is optionally subjected to further work-up steps. These are, for example, separation of the comminuted aluminum trihydroxide particles from the hot air stream and the water withdrawn from the raw mixture in step iii).

Steps i), ii) and iii) can be carried out successively or simultaneously. In a preferred embodiment, steps i), ii) and iii) are carried out simultaneously and the milling-drying process is carried out continuously. In this embodiment, the raw mixture and the hot air stream are introduced simultaneously into the milling-drying apparatus.

The residence time of the raw mixture in the milling-drying apparatus is generally from 0.01 to 1 second, preferably from 0.01 to 0.1 second and particularly preferably from 0.01 to 0.08 second. A classifier can optionally be used in the process of the invention. The classifier is preferably used after step iii). The classifier separates coarse material from the raw mixture. The coarse material which has been separated off is recirculated to the raw mixture. For the purposes of the present invention, coarse material consists of particles having particle sizes of greater than 20 μm.

The aluminum trihydroxide which can be obtained by the process of the invention has a high specific BET surface area and thus an excellent flame protection effect in plastics. The aluminum trihydroxide which can be obtained according to the invention can be readily incorporated into liquid resins and, in particular, does not lead to a drastic increase in the viscosity, as is observed in the case of the aluminum trihydroxides which are known from the prior art and have a high specific BET surface area.

The invention therefore also provides an aluminum trihydroxide which can be obtained by the process of the invention.

The aluminum trihydroxide which can be obtained by the process of the invention generally has an average particle size $D_{50}$ in the range from 3 to 15 μm, preferably from 4 to 12 μm, particularly preferably in the range from 4 to 6 μm. The aluminum trihydroxide which can be obtained by the process of the invention has a narrow particle size distribution. The $D_{10}$ values are in the range from 1 to 4 μm and preferably in the range from 1 to 1.5 μm.

The $D_{90}$ values are in the range from 9 to 20 μm and preferably in the range from 9 to 13 μm.

The aluminum trihydroxide which can be obtained by the process of the invention preferably has $D_{10}$ values in the range from 1 to 1.5 μm, $D_{50}$ values in the range from 4 to 6 μm and $D_{90}$ values in the range from 9 to 13 μm.

The aluminum trihydroxide which can be obtained by the process of the invention has a specific BET surface area in the range from 2 to 9 m$^2$/g, preferably in the range from 5 to 9 m$^2$/g. The aluminum trihydroxide which can be obtained by the process of the invention generally contains from 0 to 2% by weight, preferably from 0 to 1% by weight and more preferably from 0.1 to 0.5% by weight of water, based on aluminum trihydroxide.

In a preferred embodiment, the aluminum trihydroxide which can be obtained by the process of the invention has an average particle size $D_{50}$ in the range from 3 to 15 μm, a specific BET surface area in the range from 2 to 9 m$^2$/g and a water content in the range from 0 to 2% by weight, based on the aluminum trihydroxide.

The aluminum trihydroxide which can be obtained by the process of the invention can be incorporated into crosslinkable liquid resins. The invention therefore also provides a process for producing a thermoset, which comprises the steps
a) incorporation of an aluminum trihydroxide which can be obtained by the process of the invention into at least one crosslinkable liquid resin to form a curable mixture of aluminum trihydroxide and liquid resin, and
b) crosslinking of the mixture obtained according to a).

Step b) is carried out by methods known to those skilled in the art, for example by means of suitable hardener systems, optionally utilizing accelerators and further additives.

The invention therefore also provides a process for producing a thermoset, which comprises the steps
a) incorporation of an aluminum trihydroxide which can be obtained by the process of the invention into at least one crosslinkable liquid resin selected from the group consisting of unsaturated polyester resins, epoxy resins and polyurethanes to form a curable mixture of aluminum trihydroxide and liquid resin, and
b) crosslinking of the mixture obtained according to a).

For the purposes of the present invention, crosslinkable liquid resins are liquid polymer compositions which contain functional groups which are able to react with one another and crosslink the components of the crosslinkable liquid resin with one another. Suitable functions are double bonds, epoxide units and combinations of isocyanate and alcohol units. To produce a thermoset, it is possible to use one (1) crosslinkable liquid resin or a mixture of two or more crosslinkable liquid resins.

The invention therefore also provides a thermoset containing the aluminum trihydroxide of the invention.

The invention also provides for the use of the aluminum trihydroxide which can be obtained according to the invention as flame retardant, in particular the use as flame retardant for thermosets which can be obtained from the abovementioned crosslinkable liquid resins.

The present invention is illustrated in more detail by the following examples, without being restricted thereto.

In turn, the examples include the content of the following Figures, described in detail below.

The invention is illustrated by the following examples without being restricted thereto.

EXAMPLES

The aluminum trihydroxide which can be obtained by the process of the invention has a high specific BET surface area and thus an excellent flame retardant effect in plastics. The aluminum trihydroxide which can be obtained according to the invention can readily be incorporated into liquid resins and, in particular, does not lead to a drastic increase in viscosity, as is observed in the case of aluminum trihydroxides which are known from the prior art and have a high specific BET surface area.

Comparison of the Particle Distribution and BET Surface Area

Table 1 shows aluminum trihydroxides which have been prepared by processes from the prior art (comparative examples 1 and 2) and an aluminum hydroxide which has been prepared by the process of the invention (example according to the invention).

TABLE 1

|  | D10 [μm] | D50 [μm] | D90 [μm] | D100 [μm] | BET [m$^2$/g] |
|---|---|---|---|---|---|
| Comparative example 1 | 1.3 | 8 | 19 | — | 2.5 |
| Comparative example 2 | 1.3 | 7 | 17 | 25 | 3 |
| Example 1 according to the invention | 1.2 | 6 | 11 | 18 | 8 |

Figure 1:
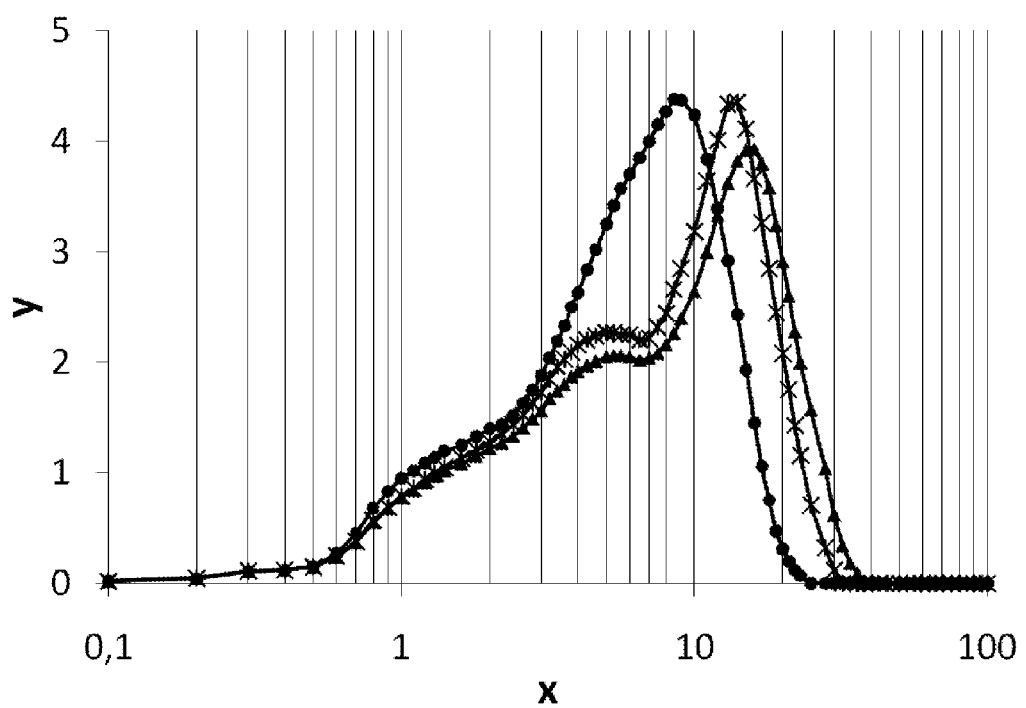
FIG. 1 is a graph depicting the particle size distribution of the aluminum trihydroxide prepared by the process of the present invention.

The aluminum trihydroxide prepared by the process of the invention is significantly finer and displays a narrower particle distribution, as is made clear by FIG. 1. In addition, the product according to the invention displays a significantly higher specific BET surface area. In FIG. 1:
X=average particle diameter, d50 (μm);
Y=histogram (×10);
Circles=example 1 according to the invention;
Star=comparative example 2;
Triangle=comparative example 1.

Comparison of the Relate Viscosity Properties

The influence on the degree of fill with aluminum trihydroxide on an unsaturated polyester resin (Palapreg P17-02 from DSM) was examined for the aluminum trihydroxide according to the invention (example 1 according to the invention) in comparison with aluminum trihydroxide from the prior art (comparative examples 1 and 2). The dispersed mixtures having increasing degrees of fill were measured in a rheometer (MCR 301 from Anton Paar) at 22° C. using a plate/plate measuring element having a diameter of 40 mm at increasing speeds of rotation. At a speed of rotation of 0.25 min$^{-1}$, a value was extracted and the viscosity obtained in this way was plotted against the degree of fill for each sample.

Figure 2:
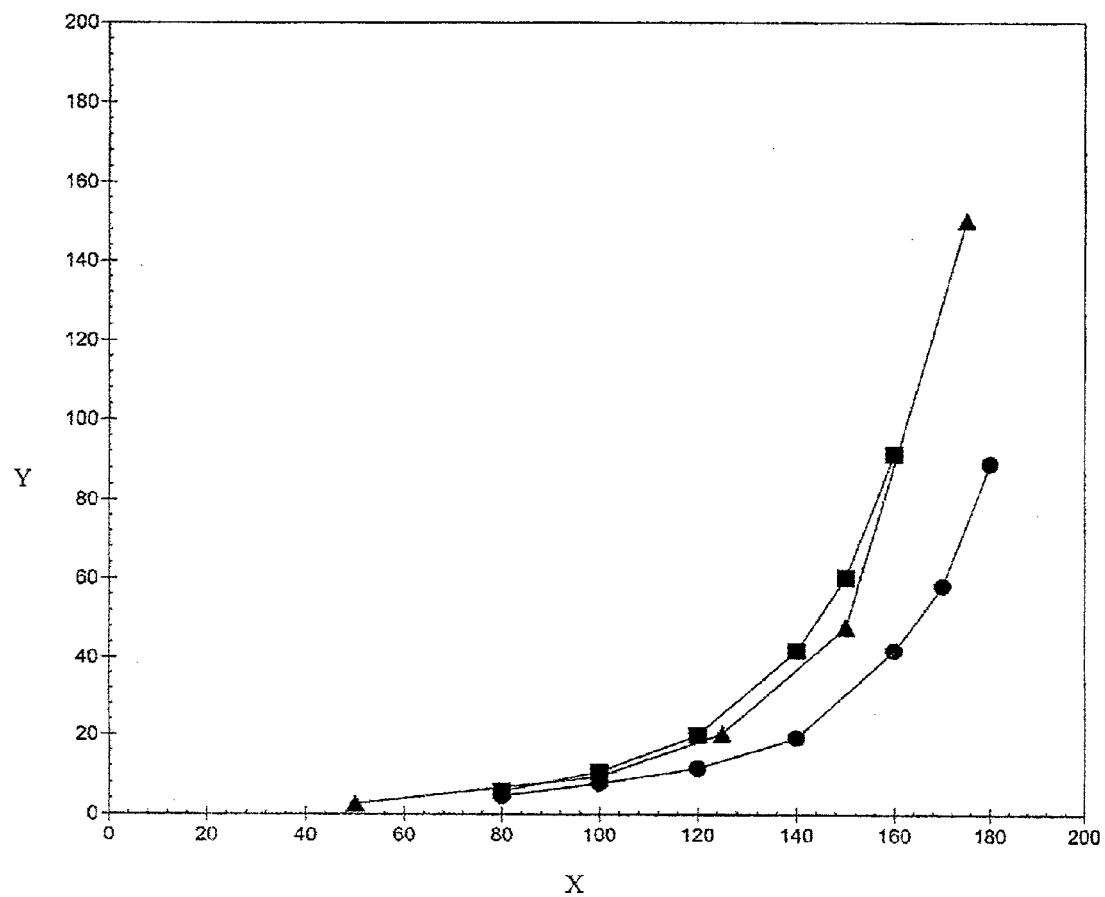
FIG. 2 is a graph showing the viscosity behavior of the aluminum trihydroxide of the present invention, prepared an example 1, as compared with comparative examples 1 and 2.

FIG. 2 shows the viscosity behavior of the aluminum trihydroxide according to the invention (example 1 according to the invention) and comparative examples 1 and 2. In FIG. 2:
X=degree of fill in phr (parts of aluminum trihydroxide per 100 parts of resin);
Y=relative viscosity increase (without unit);
(Y=(viscosity of filled resin) (viscosity of unfilled resin))
Circles=example 1 according to the invention
Triangles=comparative example 1
Squares=comparative example 2

Example 1 according to the invention displays significantly better viscosity properties, i.e. this aluminum trihydroxide brings about a significantly lower increase in viscosity than does the comparably fine aluminum trihydroxide (comparative example 2) and even the coarser aluminum trihydroxide (comparative example 1), contrary to all expectations at a significantly increased BET surface area.

The results are shown in FIG. 2.

Comparison of the Flame Retardant Properties

A resin filled with 150 parts of aluminum trihydroxide per 100 parts of resin (Palapreg P17-02) was cured and the limiting oxygen index (LOI) was subsequently measured on the cured sample. When using the aluminum trihydroxide according to the invention (example 1), a significant increase in the value from 34.4 to 37.2% of $O_2$ compared to aluminum trihydroxide according to comparative example 1 is found. This shows a significantly improved flame protection effect of the aluminum trihydroxide according to the invention compared to aluminum trihydroxide from the prior art (with simultaneously improved processability).

The results are shown in table 2:

TABLE 2

|  | LOI [% $O_2$] | BET [m$^2$/g] |
|---|---|---|
| Comparative example 1 | 34.4 | 2.5 |
| Example 1 according to the invention | 37.2 | 7.8 |
| Difference | 2.8 | 5.3 |

Comparison of the Relative Viscosity Properties:

TABLE 3

|  | BET | d10 | d50 | d90 |
|---|---|---|---|---|
| Comparative example 3 | 2.0 | 2.5 | 11.0 | 19.9 |
| Example 2 according to the invention | 2.6 | 2.0 | 10.0 | 18.7 |

Table 3 shows the particle distribution of a known aluminum trihydroxide (comparative example 3) and an aluminum trihydroxide which has been prepared by the process of the invention (example 2 according to the invention).

Here too, a positive viscosity effect is found despite a finer, narrower particle distribution and a comparable BET surface area.

Figure 3:
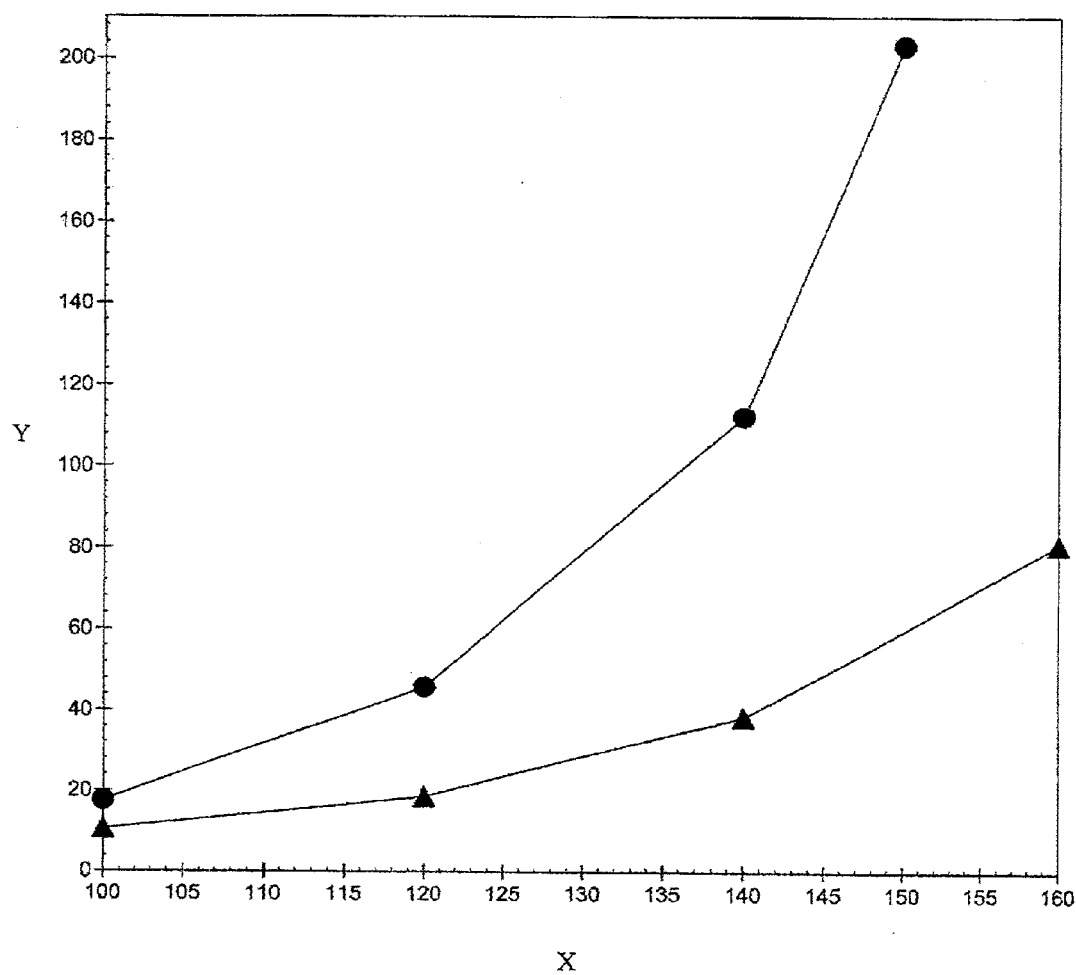
FIG. 3 is a graph comparing the measurements of viscosity as a function of the degree of fill, as between comparative example 3 and example 2 of the invention.

The results of the viscosity measurements as a function of the degree of fill are shown in FIG. 3. In FIG. 3:
X=degree of fill in phr (parts of aluminum trihydroxide per 100 parts of resin);
Y=relative increase in viscosity (without unit);
(Y=(viscosity of filled resin) (viscosity of unfilled resin))
Circles=comparative example 3

Triangles=example 2 according to the invention

Comparison of the Flame Retardant Properties

A resin filled with 150 parts of aluminum trihydroxide per 92.3 parts of epoxide novolac (D.E.N 438), 6.7 parts of dicyandiamide (Dyhard 100 S) and 1.0 part of fenuron (Dyhard UR 300) was cured and the limiting oxygen index (LOI) was subsequently measured on the cured sample. When using the aluminum trihydroxide according to example 1 according to the invention, a significant increase in the value from 46.5 to 50.5% of $O_2$ compared to aluminum trihydroxide according to comparative example 1 is found.

The results are shown in the table:

|  | LOI [% $O_2$] | BET [$m^2$/g] |
| --- | --- | --- |
| Comparative example 1 | 46.5 | 2.5 |
| Example 1 according to the invention | 50.5 | 7.8 |
| Difference | 5.0 | 5.3 |

The invention claimed is:

1. A process for the milling-drying of a raw mixture containing aluminum trihydroxide having an average particle size $D_{50}$ in the range from 50 to 130 μm and a specific BET surface area in the range from 0.01 to 0.5 $m^2$/g and containing from 0.1 to 20% by weight of water, based on the raw mixture, which comprises the steps i) introduction of the raw mixture into a milling-drying apparatus,
ii) introduction of a hot air stream having a temperature in the range from 20 to 150° C. into the milling-drying apparatus so as to flow through the milling-drying apparatus and
iii) comminution of the aluminum trihydroxide present in the raw mixture in the milling-drying apparatus.

2. The process as claimed in claim 1, wherein the raw mixture contains aluminum trihydroxide and from 3 to 15% by weight of water, based on the raw mixture.

3. The process as claimed in claim 1, wherein the raw mixture contains aluminum trihydroxide having an average particle size $D_{50}$ in the range from 90 to 110 μm.

4. The process as claimed in claim 1, wherein the milling-drying apparatus contains a rotor-stator system and the rotor has a circumferential velocity in the range from 20 to 200 m/s.

5. The process as claimed in claim 1, wherein the aluminum trihydroxide present in the raw mixture has an average residence time in the milling-drying apparatus in the range from 0.01 to 1 second.

6. The process as claimed in claim 1, wherein steps i), ii) and iii) proceed simultaneously and the process is carried out continuously.

7. The process as claimed in claim 1, wherein the hot air stream forms a turbulent flow having a Reynolds number of greater than 3000 in the milling apparatus.

* * * * *